US010557961B2

(12) United States Patent
Hagiwara

(10) Patent No.: US 10,557,961 B2
(45) Date of Patent: Feb. 11, 2020

(54) LOGGING TOOL WITH ELECTRIC DIPOLE SOURCE AND MAGNETIC SENSOR FOR FORWARD AND LATERAL IMAGING

(71) Applicant: Aramco Services Company, Houston, TX (US)

(72) Inventor: Teruhiko Hagiwara, Houston, TX (US)

(73) Assignee: Saudi Arabian Oil Company (SA)

(*) Notice: Subject to any disclaimer, the term of this patent is extended or adjusted under 35 U.S.C. 154(b) by 162 days.

(21) Appl. No.: 15/483,819

(22) Filed: Apr. 10, 2017

(65) Prior Publication Data

US 2018/0292560 A1 Oct. 11, 2018

(51) Int. Cl.
*G01V 3/28* (2006.01)
(52) U.S. Cl.
CPC .................................... *G01V 3/28* (2013.01)
(58) Field of Classification Search
CPC ....................................................... G01V 3/28
See application file for complete search history.

(56) References Cited

U.S. PATENT DOCUMENTS

| 9,482,776 | B2 | 11/2016 | Hagiwara | |
|---|---|---|---|---|
| 2005/0133262 | A1* | 6/2005 | Chen | G01V 3/24 175/40 |
| 2005/0189945 | A1* | 9/2005 | Reiderman | G01V 3/28 324/333 |
| 2011/0133740 | A1 | 6/2011 | Seydoux et al. | |
| 2014/0216818 | A1* | 8/2014 | Hagiwara | E21B 7/04 175/61 |
| 2014/0368199 | A1 | 12/2014 | Bittar et al. | |
| 2017/0068016 | A1 | 3/2017 | Donderici et al. | |

FOREIGN PATENT DOCUMENTS

WO 2017058144 A1 4/2017

OTHER PUBLICATIONS

International Search Report and Written Opinion for International Application No. PCT/US2018/026856, dated Aug. 2, 2018 (pp. 1-13).

(Continued)

*Primary Examiner* — Patrick Assouad
*Assistant Examiner* — Feba Pothen
(74) *Attorney, Agent, or Firm* — Bracewell LLP; Constance G. Rhebergen

(57) ABSTRACT

A logging method and system for imaging forward and lateral sections of a subterranean formation. An electric dipole source generates electromagnetic field in the formation that is sensed with magnetic flux sensor that is spaced a distance away from the electric dipole source. The resulting electric dipoles can be axial or transverse, and magnetic flux sensors can sense magnetic fields oriented axially or orthogonally. The axial and transverse electric dipoles can be collocated, and magnetic flux sensors that sense axial or orthogonal magnetic fields can be collocated. Analyzing changes in the magnitude of signals sensed by magnetic flux sensors can indicate the presence and distance of bed boundaries that are ahead and lateral to the electric dipole source.

19 Claims, 13 Drawing Sheets

(56) References Cited

OTHER PUBLICATIONS

J. Seydoux, et al., "A Deep-Resistivity Logging-While-Drilling Device for Proactive Geosteering," 2003 Offshore Technology Conference, Houston, TX May 5-8, 2003.
T. Hagiwara, "Extra-Long Spaced Induction Log," presented at the 74th SEG Annual Meeting, Denver, CO, Oct. 10-15, 2004.
T. Hagiwara, "Direct Determination of Dip and Anisotropy Using Tri-Axial Electric Dipole Logging," presented at the 86th SEG Annual Conference, Dallas, Oct. 2016.

* cited by examiner

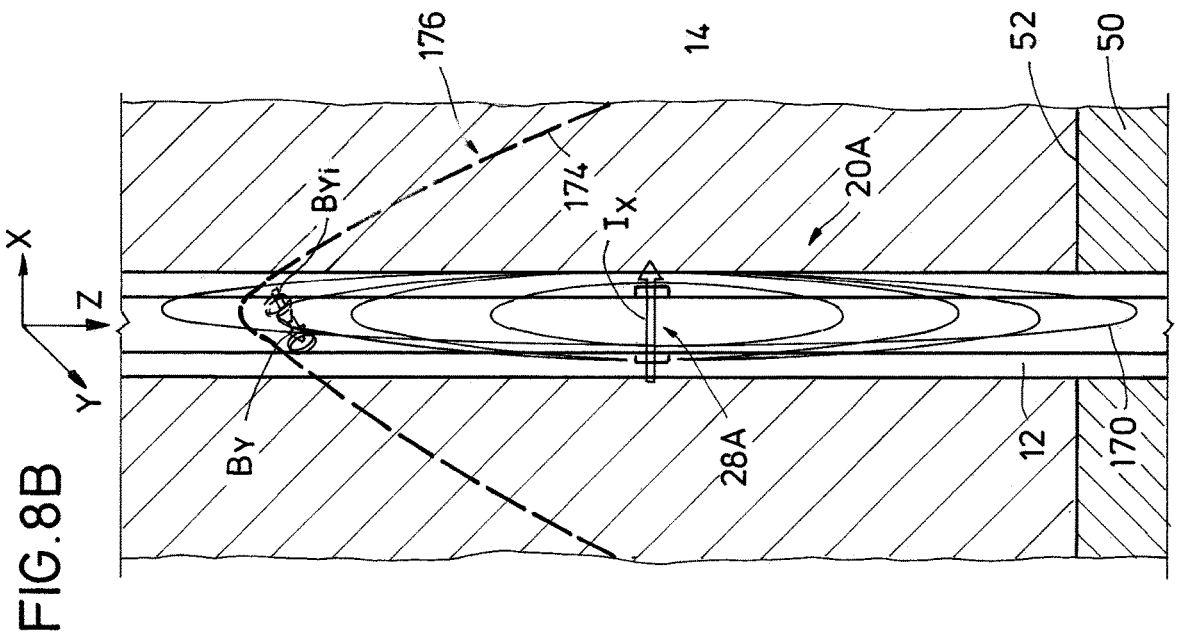
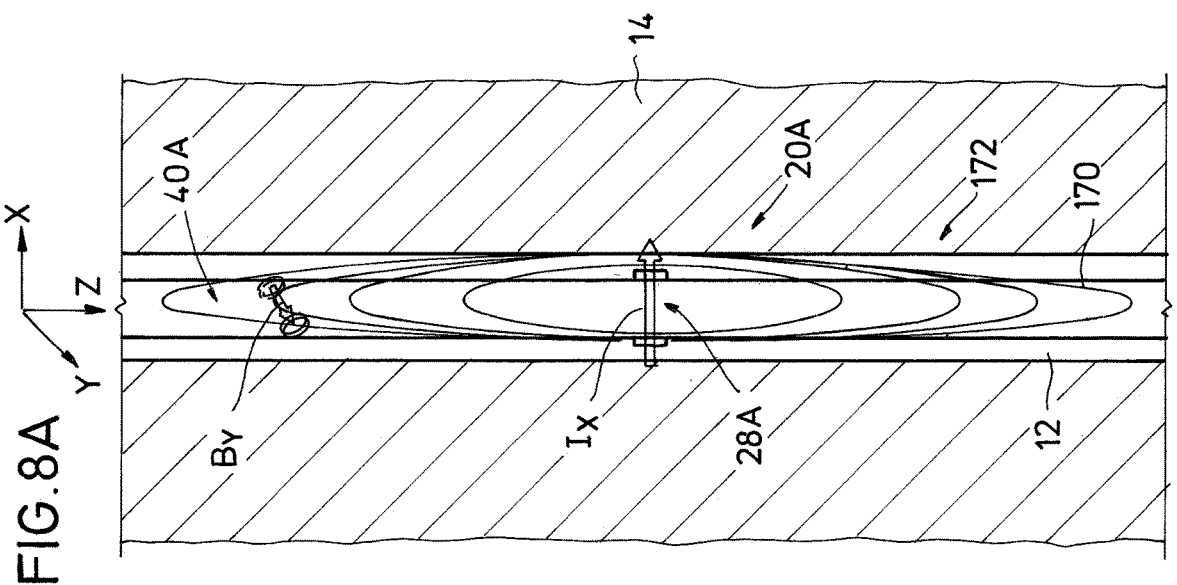

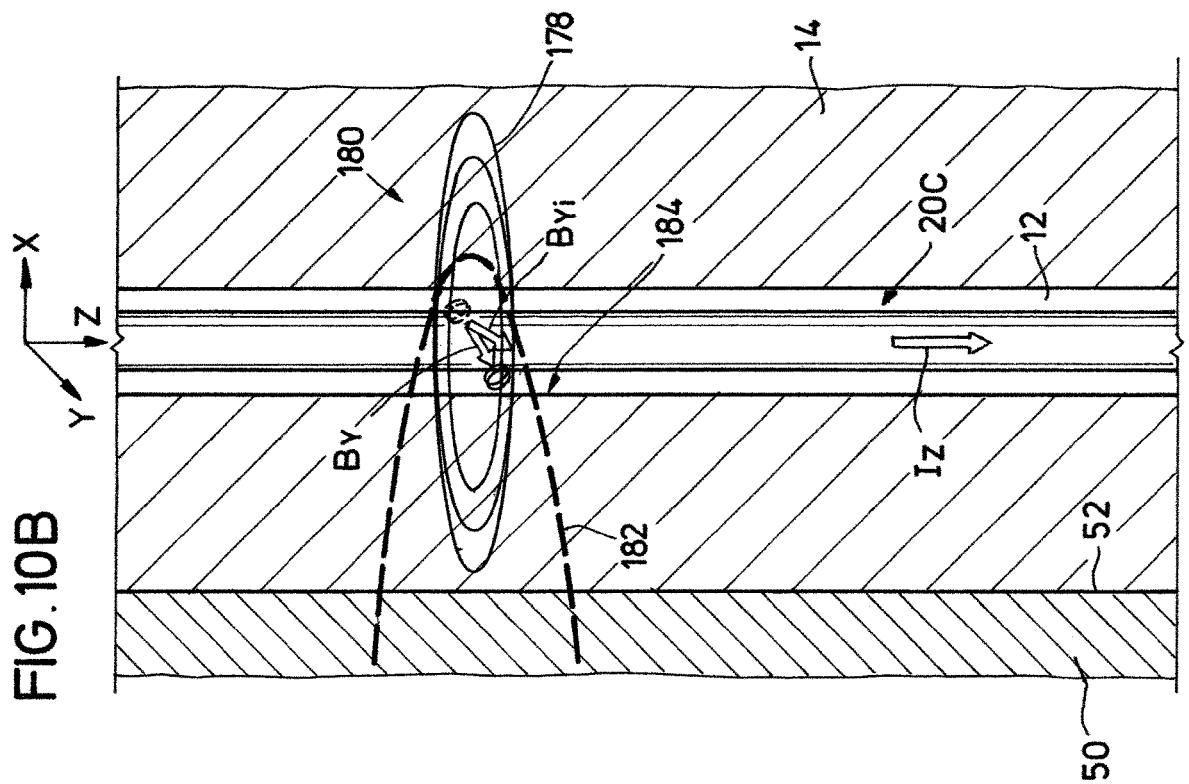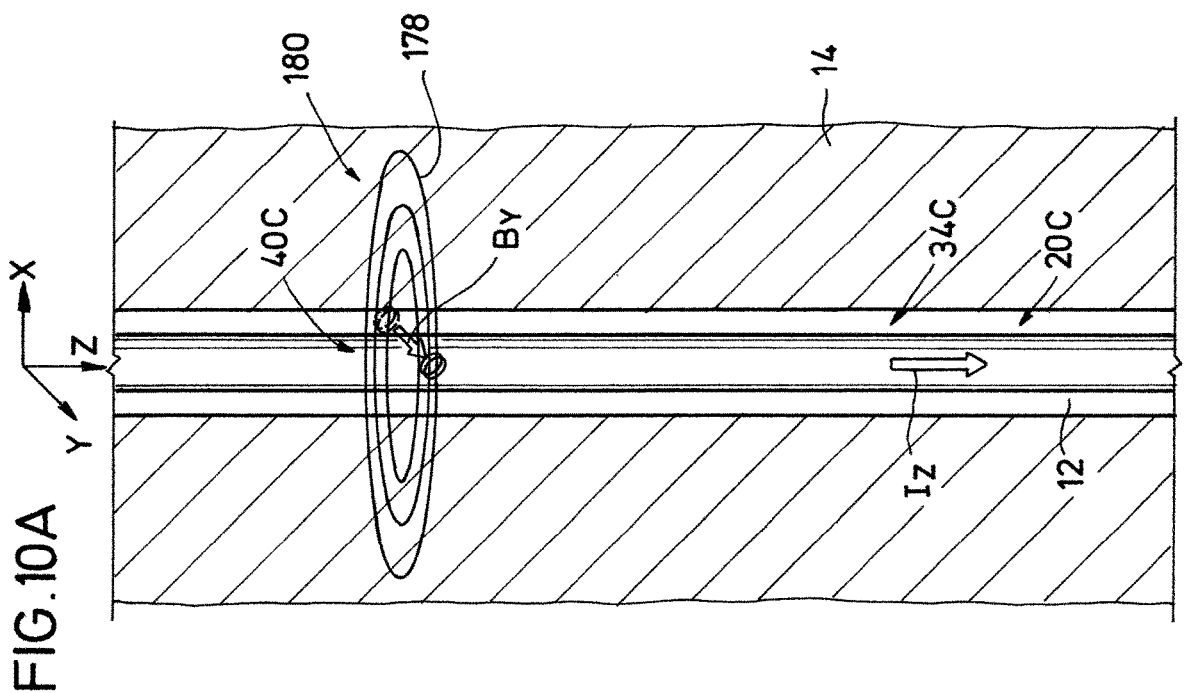

LOGGING TOOL WITH ELECTRIC DIPOLE SOURCE AND MAGNETIC SENSOR FOR FORWARD AND LATERAL IMAGING

BACKGROUND OF THE INVENTION

1. Field of Invention

The present disclosure relates to imaging strata that is forward and lateral to an imaging device. More specifically, the present disclosure relates to a logging tool with an electric dipole source and a magnetic sensor that images formation forward and lateral to the tool.

2. Description of Prior Art

A resistivity measurement is one typical subterranean formation evaluation procedure where a log of the resistivity adjacent a wellbore is measured. Formation resistivity is a function of any fluids trapped within the subterranean formation. Thus resistivity is often measured to identify where water and/or hydrocarbon are present in the formation. Changes in resistivity in a subterranean formation can be abrupt and define a bed boundary. Resistivity can be measured with a wireline tool or a logging while drilling (LWD) tool. Measuring resistivity with a galvanic (DC) resistivity device typically involves forming an electrical potential in the formation and measuring a voltage between voltage measuring electrodes of the device. In an induction measurement device, magnetic flux/magnetic field is induced in the formation by the current in the transmitter; which induces a measured voltage in a receiver of the tool spaced axially from the transmitter. During LWD operations, there is a desire to "look ahead" so as to avoid drilling across bed boundaries or faults, as well as any subterranean geological hazard.

Induction-type logging tools have been used to measure formation resistivity as the in-phase response of an induction log is approximately proportional to the formation conductivity. Generally, the in-phase response is much weaker compared to the out-of-phase inductive response, so backing coils are used to suppress the out-of-phase signal. The propagation tool for LWD and geosteering operations, the formation resistivity is measured by the phase difference and the attenuation of responses between a pair of receivers. In geosteering operations, the resistivity measurement is sometimes used to detect a bed boundary and help estimate the distance to the bed boundary. Usually though identifying the bed boundary is a primary concern in geosteering operations rather than obtaining the resistivity measurement. The bed boundary can be detected and estimated more easily by using the stronger out-phase response in an induction type tool, or the response at a single receiver in LWD propagation tool. For example, the cross component response between an orthogonal pair of axial transmitter and transverse receiver can detect the bed boundary around the tool. However, the sensitivity to the distance to the bed in the primary response diminishes once the distance exceeds roughly about the length of transmitter-receiver offset.

SUMMARY OF THE INVENTION

Described herein is an example of a method of operations in a borehole, and that includes generating an electric dipole by forming a magnetic field in a formation that surrounds the borehole, using a coil in the borehole at a location spaced axially away from the electric dipole to sense magnetic flux that is generated by the electric dipole, and identifying a distance and a direction of a bed boundary from the electric dipole that is in the formation based on the step of sensing magnetic flux. In one example, the bed boundary is spaced away from the electric dipole in an axial direction of the borehole, or alternatively the bed boundary is spaced away from the electric dipole in a radial direction of the borehole. In an embodiment, the electric dipole is oriented along a path that is substantially transverse to an axis of the borehole, and wherein a direction of the measured magnetic flux extends along a path that is oriented substantially parallel to an axis of the borehole. In one example, the electric dipole is oriented along a path that is substantially parallel to an axis of the borehole and wherein a direction of the measured magnetic flux extends along a path that is oriented substantially orthogonal to an axis of the borehole and to the electric dipole. In an alternative, the electric dipole is oriented along a path that is substantially transverse to an axis of the borehole and wherein a direction of the measured magnetic flux extends along a path that is oriented substantially orthogonal to an axis of the borehole and to the electric dipole. The method further optionally includes measuring magnetic flux in a direction that extends along a path that is oriented substantially orthogonal to an axis of the borehole, or alternatively the method further includes generating an electric dipole that is oriented along a path that is substantially parallel to an axis of the borehole. Embodiments exist wherein the measured magnetic flux provides an indication of a bed boundary that is spaced away from the electric dipole along a path that is substantially parallel with an axis of the borehole. The measured magnetic flux optionally provides an indication of a bed boundary that is spaced away from the electric dipole along a path that is substantially transverse to an axis of the borehole. In a further example, the measured magnetic flux provides an indication of a bed boundary that is spaced away from the electric dipole along a path that is substantially transverse to an axis of the borehole.

Also described herein is an example of a method of operations in a borehole and that includes generating a magnetic field in a formation that surrounds the borehole by generating an electric dipole in the borehole, measuring magnetic flux in the borehole at a location that is spaced axially away from the electric dipole, and identifying a bed boundary in the formation based on the step of measuring magnetic flux. In an alternative, the electric dipole extends along a path generally transverse to an axis of the borehole, and wherein lines of magnetic flux being measured extend along a path that is selected from the group consisting of generally parallel with an axis of the borehole and generally orthogonal to the axis of the borehole. In one example, the electric dipole extends along a path generally parallel with an axis of the borehole, and wherein lines of magnetic flux being measured extend along a path that is orthogonal with the axis of the borehole, and wherein the electric dipole is formed within a drill string having a drill bit, the method further including steering the drill bit away from the bed boundary.

An example of a tool for use in a borehole is also described herein, and which includes a means for forming an electric dipole that generates a magnetic field in a formation surrounding the borehole, the means being coupled to the housing, a means for sensing magnetic flux generated by the electric dipole, a housing disposable in the borehole that is coupled to the means for forming an electric dipole and coupled to the means for sensing magnetic flux, and a means for identifying the presence of a bed boundary in the formation in a direction spaced axially and radially from the housing. The means for forming an electric dipole optionally includes transversely disposed electrodes that generate a dipole that projects transverse to an axis of the housing, and wherein the means for sensing magnetic flux generated by the electric dipole has windings that are generally coaxial with a path that extends orthogonal with the axis of the housing. In one alternative, the means for forming an electric dipole is transversely disposed electrodes that generate a dipole that projects transverse to an axis of the housing, and wherein the means for sensing magnetic flux generated by the electric dipole includes a winding that is generally coaxial with an axis of the housing. In an alternative, the means for forming an electric dipole is made up of axially spaced apart ring electrodes that generate an dipole that projects generally parallel with an axis of the housing, and wherein the means for sensing magnetic flux generated by the electric dipole comprises windings that are generally coaxial with a path that extends orthogonal with the axis of the housing. In one embodiment, the means for forming an electric dipole includes transversely disposed electrodes that generate an dipole that projects transverse to an axis of the housing, and wherein the means for sensing magnetic flux generated by the electric dipole includes windings that are generally coaxial with a path that extends orthogonal with the axis of the housing and a winding that is generally coaxial with an axis of the housing. In one alternative, the means for forming an electric dipole has transversely disposed electrodes that generate an dipole that projects transverse to an axis of the housing and axially spaced apart ring electrodes that generate an dipole that projects generally parallel with the axis of the housing, and wherein the means for sensing magnetic flux generated by the electric dipole are made up of windings that are generally coaxial with a path that extends orthogonal with the axis of the housing.

BRIEF DESCRIPTION OF DRAWINGS

Some of the features and benefits of the present invention having been stated, others will become apparent as the description proceeds when taken in conjunction with the accompanying drawings, in which:

FIGS. 8A, 9A, and 10A are partial sectional views of examples of downhole tools imaging a homogenous formation.

FIGS. 8B, 9B, and 10B are sectional views of examples of the tools of FIGS. 8A, 9A, and 10A respectively approaching formation changes.

Figure 4:
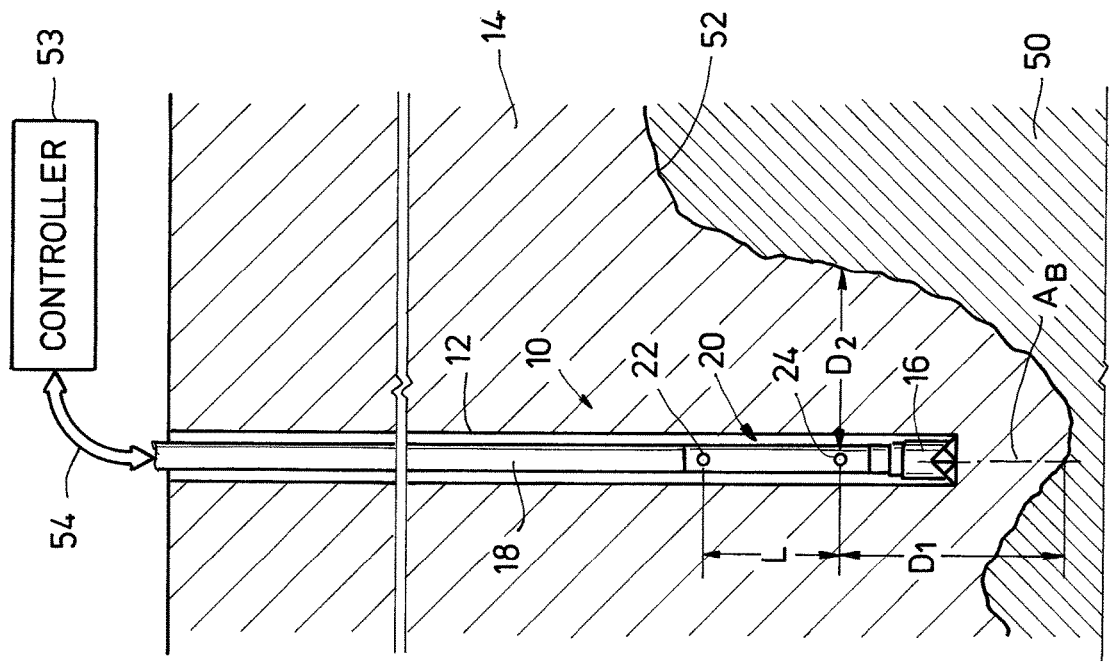
FIG. 4 is a sectional view of an example of the drilling system and logging tool of FIG. 1 encountering a bed boundary.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about", "substantially", and "generally" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
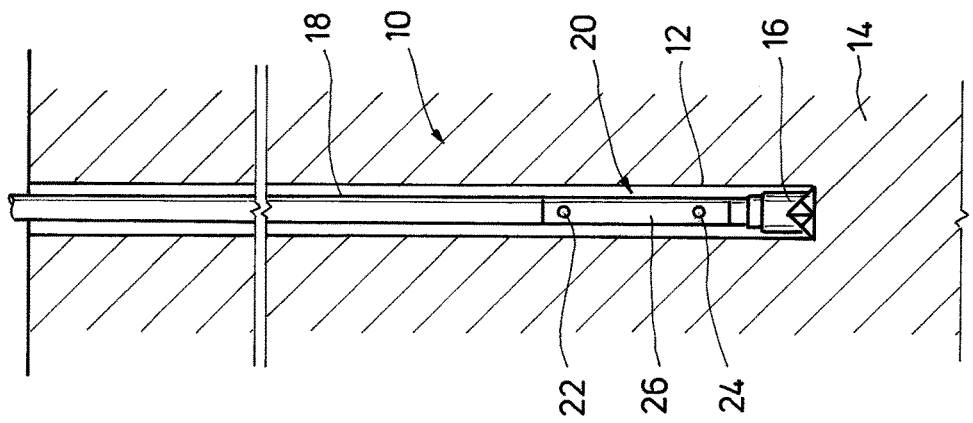
FIG. 1 is a sectional view of an example of a drilling system forming a wellbore in a formation, and a logging tool for imaging the formation.

Shown in a side partial sectional view in FIG. 1 is an example of a drilling system 10 forming a wellbore 12 through a formation 14. Included with the drilling system 10 is a drill bit 16 shown disposed on a lower end of a drill string 18, and wherein an imaging tool 20 is shown provided within the drill string 18. The imaging tool 20 includes transducers 22, 24 shown within a housing 26. As described in more detail below, one of the transducers 22, 24 generates a signal in the form of an electromagnetic field within the formation 14, and that is then sensed by another one of the transducers 22, 24. Further, variations in the electromagnetic field provide indications of characteristics within formation 14, such as a boundary to an adjacent formation or subterranean structure. Examples exist wherein one or more of transducers 22, 24 include a sensor for sensing a signal, a transmitter for transmitting a signal, or both. In one embodiment, the sensor includes a receiver. In an alternative, one of transducers 22, 24 includes a transmitter, and the other of the transducers 22, 24 includes a sensor.

Figure 2A:
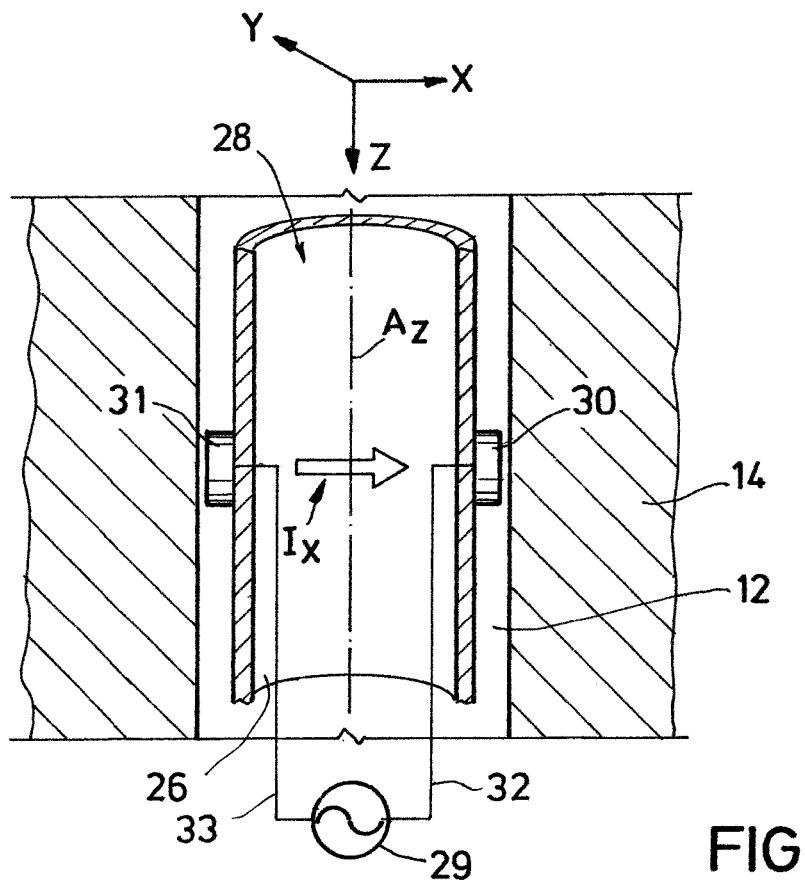
FIG. 2A is a side partial sectional perspective view of an example of a transverse electrical dipole source.

FIGS. 2A through 2D illustrate optional examples of the transducers 22, 24 of FIG. 1. In the example of FIG. 2A shown is one embodiment of a transverse electrical transducer 28 which is powered by a power source 29. In the example, power source 29 is depicted as an alternating current power source. The embodiment of the transducer 28 of FIG. 1 includes electrodes 30, 31 that are illustrated 180 degrees apart from one another and on an outer surface of housing 26. Other examples of the electrical transducer 28 includes a toroidal coil (not shown). As shown, electrodes 30, 31 are electrically coupled with formation 14 that surrounds borehole 12. In one embodiment, insulation is selectively provided along the outer surface of ring electrodes 30, 31. Lines 32, 33 provide electrical communication between electrodes 30, 31 and power source 29. By energizing electrodes 30, 31 with opposite polarities, an electrical dipole $I_X$ is generated and along a path that extends between electrodes 30, 31. Examples of the electrical transducer 28 include anything that can generate electrical dipole $I_X$, including the toroidal coil noted above. In the illustrated example, the orientation of the electric dipole $I_X$ is substantially transverse to an axis $A_Z$ of housing 26. Alternate embodiments of electrodes 30, 31 exist for generating electric dipole $I_X$. Generally, axis $A_Z$ of housing 26 will be substantially parallel with axis $A_B$ of wellbore 12 (FIG. 1). Further illustrated in FIG. 2A is a Cartesian coordinate system with axes X, Y, Z. When the electrodes 30, 31 are energized by application of electricity from power source 29, an electromagnetic field (not shown) is generated within borehole 12 and formation 14 that has lines that lie in the Y, Z plane. Disruption of the field when sensed is one example of how discontinuities in the formation 14 are identified.

Figure 2B:
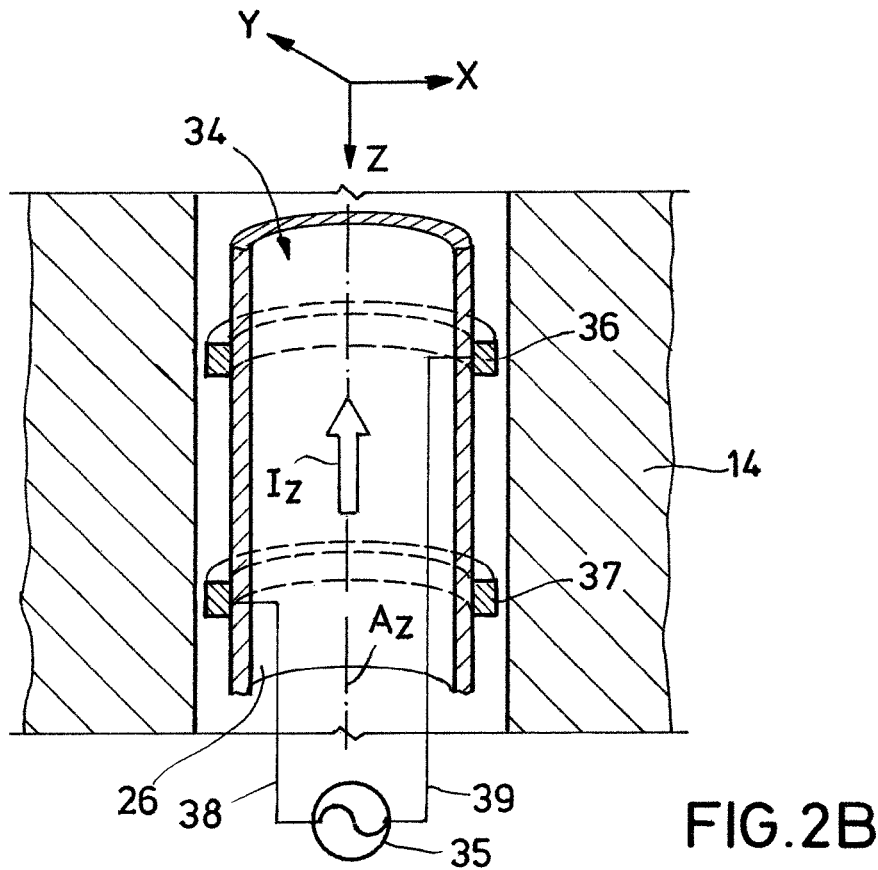
FIG. 2B is a side partial sectional perspective view of an example of an axial electrical dipole source.

Illustrated in FIG. 2B is an alternate example of a means of generating an electromagnetic field and which is referred to as an axial electrical transducer 34. Power source 35 selectively provides electricity to the axial electrical transducer 34 for generating an electromagnetic field within formation 14 and can provide alternating current. Further included with axial electrical transducer 34 are ring electrodes 36, 37 shown axially spaced apart from one another and circumscribing an outer surface of housing 26. As FIG. 2B is shown in a side sectional view, only a portion of ring electrodes 36, 37 are illustrated, however, ring electrodes 36, 37 extend substantially around the entire housing 26. Moreover, insulation may be selectively provided along the outer surface of ring electrodes 36, 37. In this example, an electric dipole $I_C$ is shown formed within housing 26 and extending along a path that is substantially parallel or coaxial with axis $A_Z$ of housing 26. In this example, an electromagnetic field is formed in formation 14 that circumscribes axis $A_Z$. Additionally, lines 38, 39 provide selective communication between power source 35 and electrodes 36, 37.

Figure 2C:
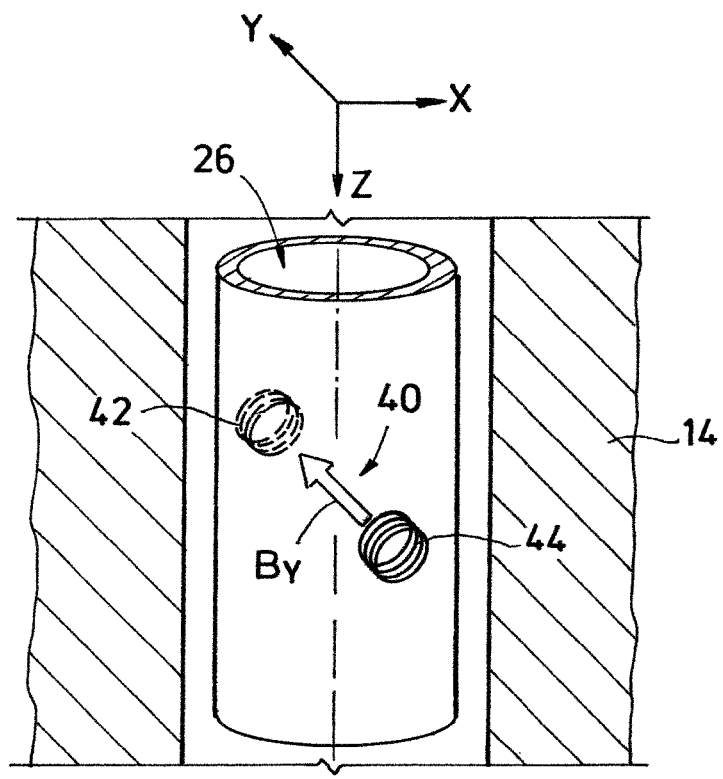
FIG. 2C is a side partial sectional perspective view of an example of an orthogonal magnetic sensor.

FIG. 2C shows in a side partial sectional view an example of a transverse magnetic sensor 40 wherein windings 42, 44 are mounted on an outer surface of housing 26. In this example, the windings 42, 44 are strategically oriented to be substantially coaxial along axis Y of the XYZ coordinate system illustrated in FIG. 2C. The orientation of windings 42, 44 is such that magnetic flux $B_Y$ is measured by monitoring voltage induced through the windings 42, 44. Optionally, a recess (not shown) is provided on the outer surface of housing 26 to receive windings 42, 44.

Figure 2D:
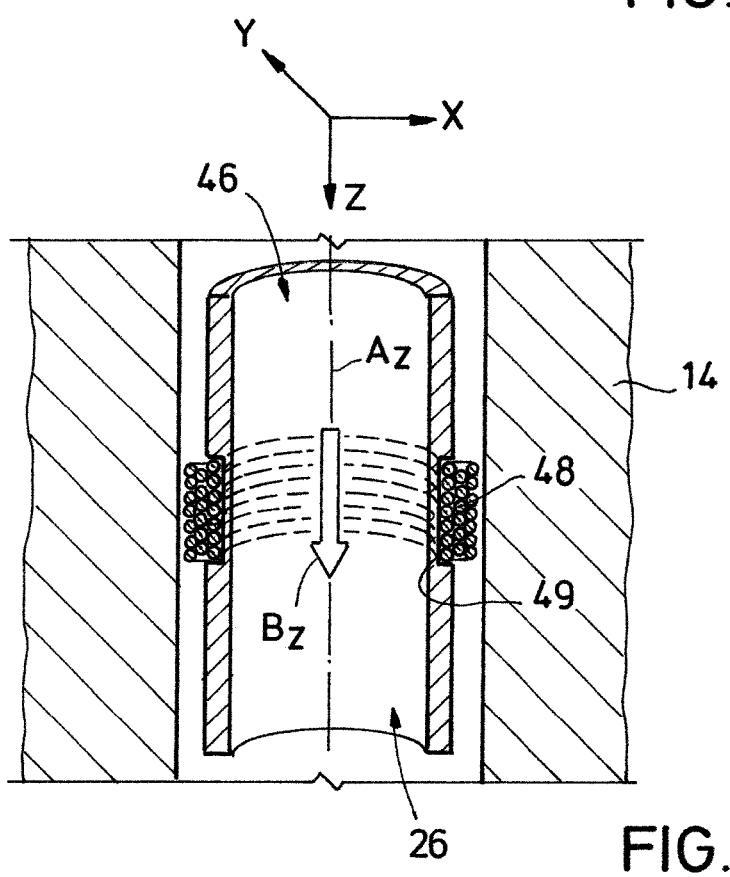
FIG. 2D is a side partial sectional perspective view of an example of an axial magnetic sensor.

Shown in a side sectional view in FIG. 2D is an example of an axial magnetic sensor 46, where a winding 48 formed circumferentially along an outer surface of housing 26. An optional recess 49 is provided along outer surface of housing 26 to receive winding 48. In this example, the winding 48 can sense the presence of magnetic flux $B_Z$ represented extending along the axis $B_Z$ of housing 26 and Z component of the coordinate system illustrated in FIG. 2D.

Figure 3A:
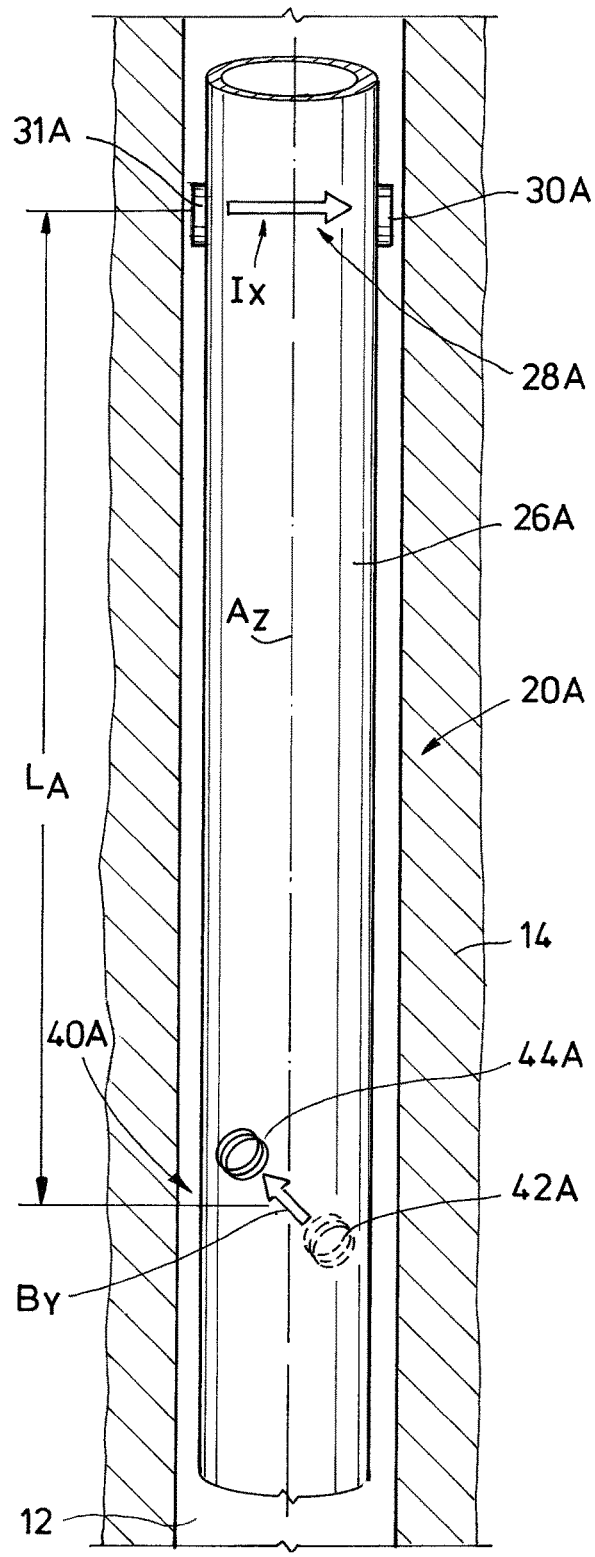
FIG. 3A is a side partial sectional view of an alternate embodiment of a portion of the logging tool of FIG. 1, and having a transverse electrical dipole source, and an orthogonal magnetic sensor.

FIG. 3A illustrates an alternate example of imaging tool 20A disposed in wellbore 12 where the electric dipole source includes the transverse electrical transducer 28A with its electrodes 30A, 31A and shown forming electric dipole $I_X$. Further in this example, shown is one embodiment of the transverse magnetic sensor 40A, that is orthogonal to the electric dipole $I_X$, and that is coupled with housing 26A and disposed a distance $L_A$ from transverse electrical transducer 28A. As will be described in more detail below, the configuration of the imaging tool 20A of FIG. 3A is useful for imaging characteristics and changes of the formation 14 in portions of formation 14 that are spaced along axis $A_Z$ of housing 26A.

Figure 3B:
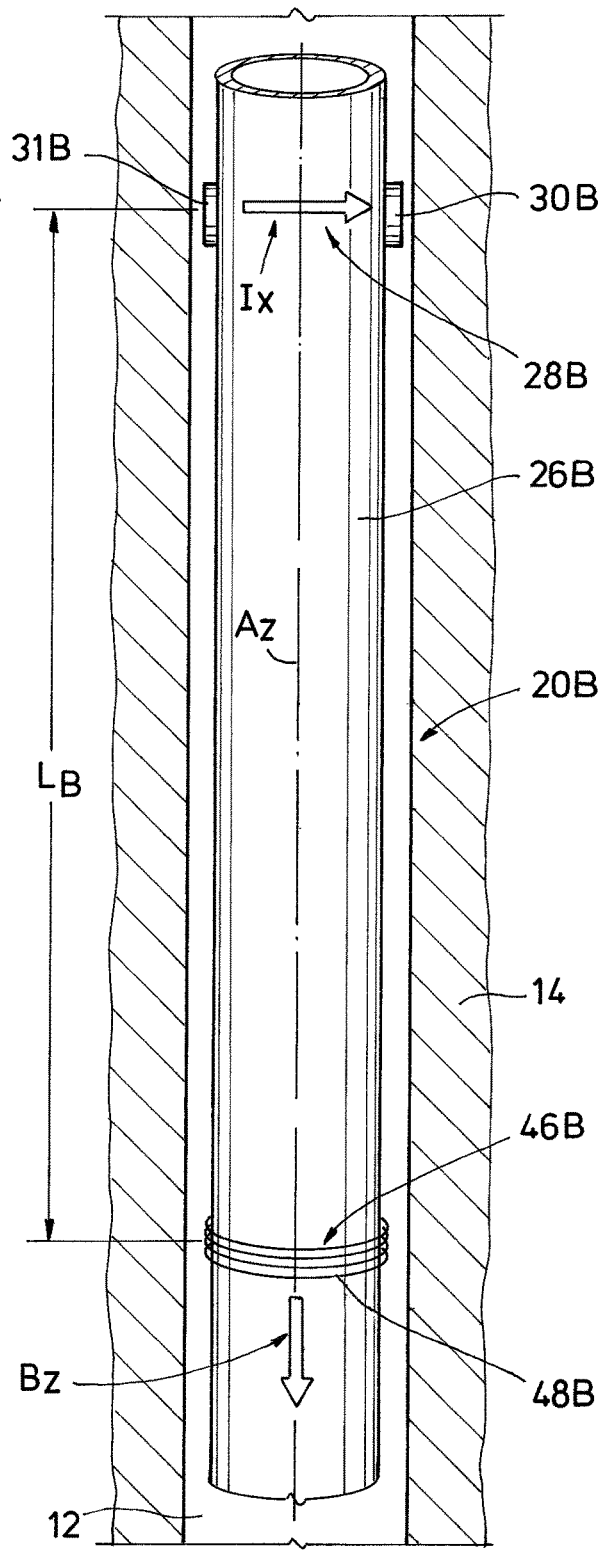
FIG. 3B is a side partial sectional view of an alternate embodiment of a portion of the logging tool of FIG. 1, and having a transverse electrical dipole source, and an axial magnetic sensor.

In another embodiment of imaging tool 20B, electric dipole source is a transverse electrical transducer 28B with electrodes 30B, 31B that generates an electric dipole $I_X$ that is substantially transverse to axis $A_Z$ of housing 26B. Further in this example, the sensing unit is an example of the axial magnetic sensor 46B with its winding 48B on the outer surface of housing 26B and which is sensitive to magnetic flux $B_Z$. In this example, the axial magnetic sensor 46B is spaced a distance $L_B$ away from the transverse electrical transducer 28B (i.e. transverse electric dipole source). In the configuration of FIG. 3B, characteristics of the formation 14 that project radially outward from axis $A_Z$ are detectable.

Figure 3C:
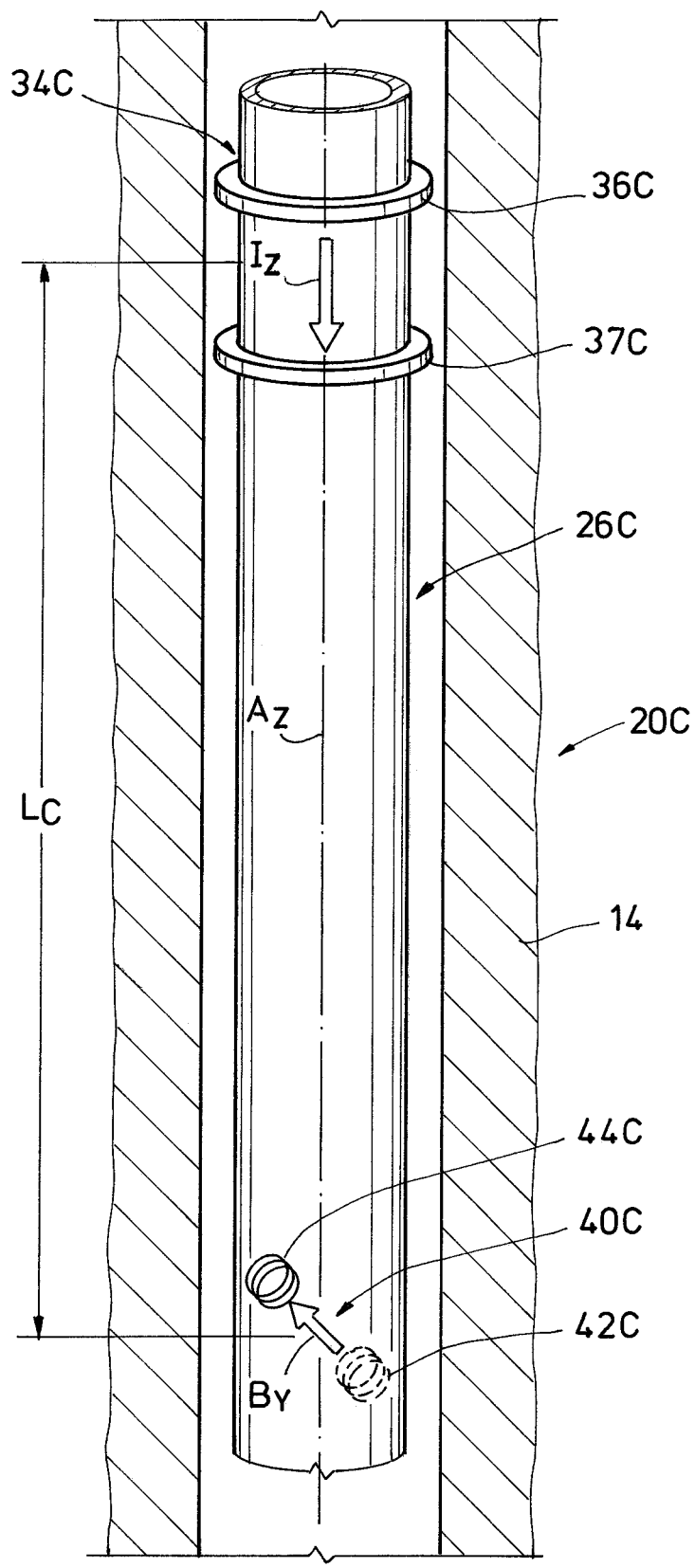
FIG. 3C is a side partial sectional view of an alternate embodiment of a portion of the logging tool of FIG. 1, and having an axial electrical dipole source, and an orthogonal magnetic sensor.

Depicted in FIG. 3C is another example of an imaging tool 20C where the electric dipole source is an embodiment of an axial electrical transducer 34C and whose electrode rings 36C, 37C form a dipole $I_Z$ that projects along a direction generally parallel with axis $A_Z$ of housing 26C. In the embodiment of the imaging tool 20C of FIG. 3C, the sensing device is a transverse magnetic sensor 40C whose rings 42C, 44C are coaxial with line running orthogonal to axis $A_Z$, which is generally on line with axis Y from the coordinate system of FIGS. 2A-2D, and therefore sensitive to magnetic field in the Y direction and senses magnetic flux $B_Y$. Here, the axial electrical transducer 34C is spaced a distance $L_C$ away from the transverse magnetic sensor 40C.

Figure 3D:
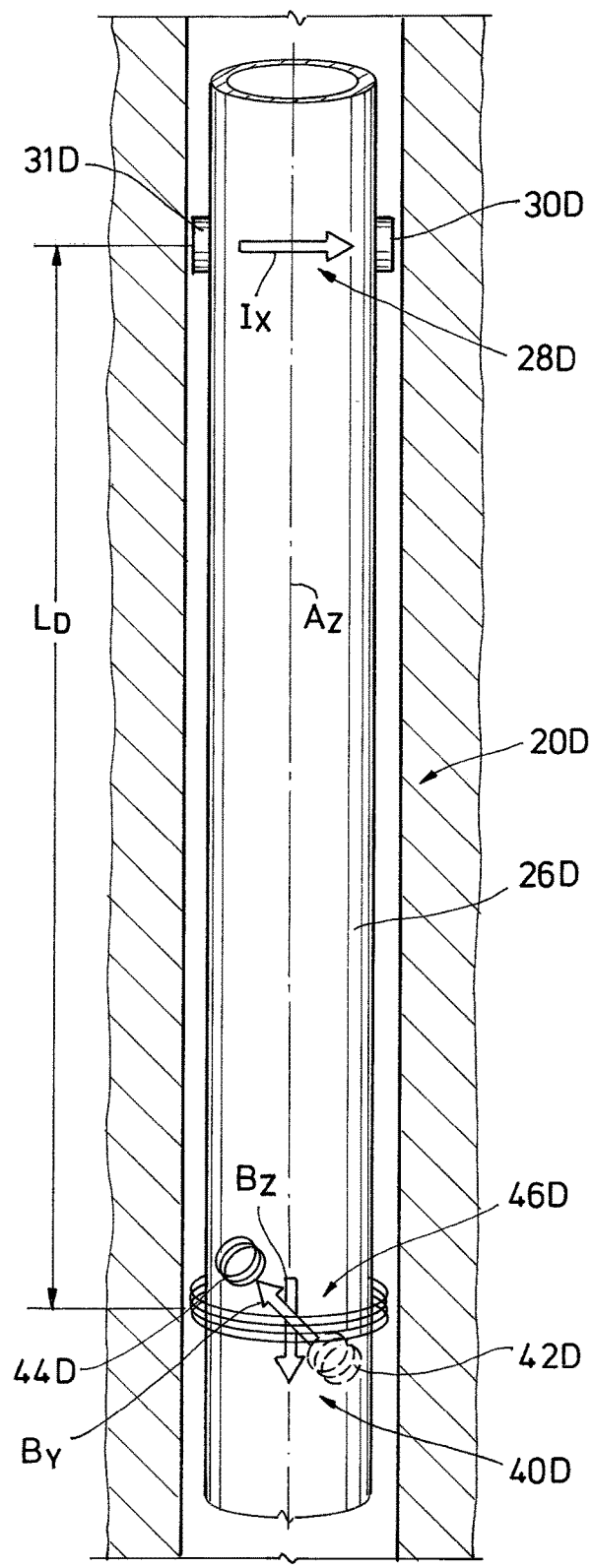
FIG. 3D is a side partial sectional view of an alternate embodiment of a portion of the logging tool of FIG. 1, and having an axial electrical dipole source, and an orthogonal magnetic sensor collocated with an axial magnetic sensor.

Shown in a side partial sectional view in FIG. 3D is another alternate example of imaging tool 20D where the source is the transverse electrical transducer 28D with electrodes 30D, 31D and an running transverse to axis $A_Z$ of housing 26D. The sensing unit shown in FIG. 3D are a pair of collocated sensors that include a transverse magnetic sensor 40D and an axial magnetic sensor 46D. In a non-limiting example, the term collocated describes sensors or signal sources that are at substantially the same location on an imaging tool. In the example of FIG. 3D, the embodiments of the sensors of FIGS. 3A and 3B are shown combined. As shown, transverse magnetic sensor 40D and axial magnetic sensor 46D are spaced a distance $L_D$ from transverse electrical transducer 28D.

Figure 3E:
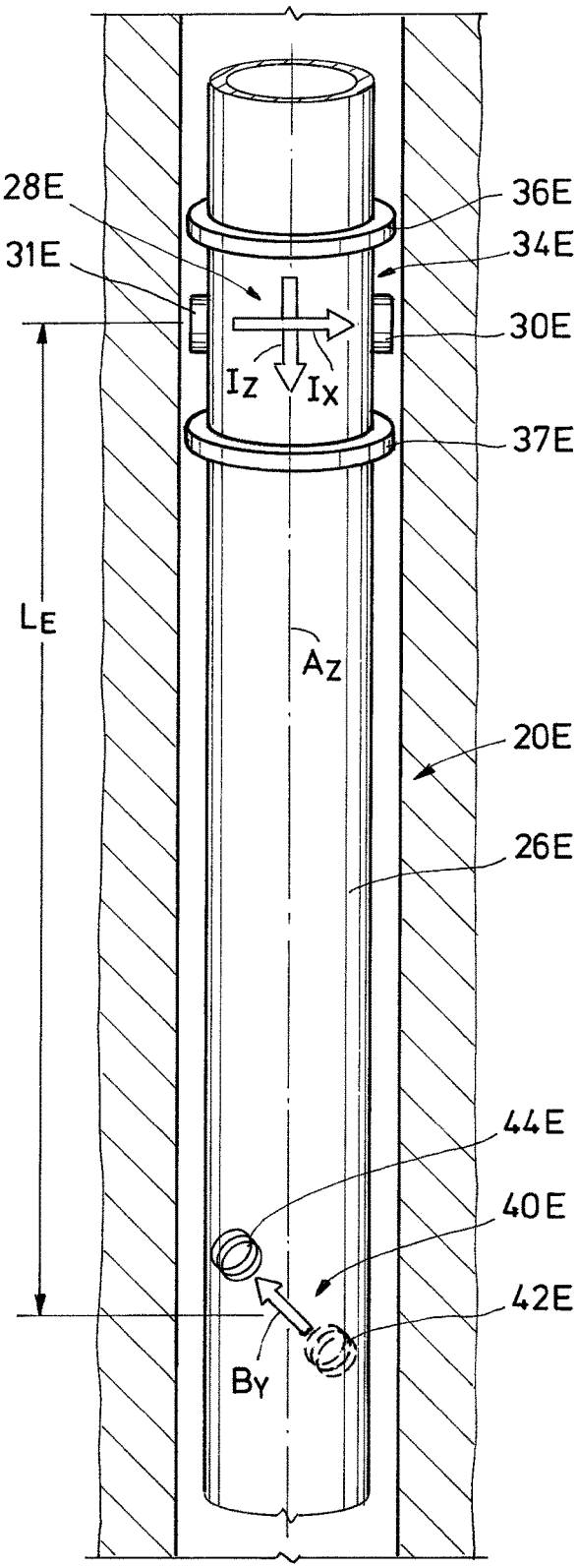
FIG. 3E is a side partial sectional view of an alternate embodiment of a portion of the logging tool of FIG. 1, and having an axial electrical dipole source collocated with a transverse electrical dipole source, and an orthogonal magnetic sensor.

In the example of FIG. 3E, shown in a side partial sectional view is another embodiment of imaging tool 20E and where dipole sources are collocated. More specifically, a dipole source is shown as an example of the transverse electrical transducer 28E with its electrodes 30E, 31E disposed at substantially the same axial location on the housing 26E, but spaced circumferentially distal from one another on the outer surface of housing 26E. Here the application of electricity to electrodes 30E, 31E forms electrical dipole $I_X$ along the X axis. Collocated with electrodes 30E, 31E is another dipole source that is an axial electrical transducer 34E with electrode rings 36E, 37E, and that generates dipole $I_Z$ along the Z axis by applying electricity to the rings 36E, 37E. The sensor of the imaging tool 20E of FIG. 3E includes one example of the transverse magnetic sensor 40E whose coils or windings 42E, 44E are along the Y axis and sense magnetic field $B_Y$. The collocated electrical dipole sources and magnetic sensor are shown spaced a distance $L_E$ away from each other.

FIG. 4 shows further example of the drilling system 10 extending wellbore 12 and where the imaging tool 20 is approaching a formation 50 having characteristics that are different from formation 14. Examples of differing characteristics include permeability, dielectric constant, and resistivity, to name a few. The interface between formations 14, 50 defines a bed boundary 52 which is shown a distance D1 from transducer 24 and along axis $A_B$ of the wellbore 12. Additionally, the transducer 24 is illustrated as being a distance D2 from bed boundary 52 along a distance that extends radial to the wellbore 12. In a non-limiting example of operation, transducer 24 is made up of one or more of the dipole sources of FIGS. 2A and 2B, and transducer 22 is made up of one or more of the sensors of FIGS. 2C and 2D. By selectively energizing the dipole sources from FIGS. 2A, 2B, and FIGS. 3A through 3E, and then sensing the resulting magnetic fields in the formation 14, the location of bed boundary 52 with respect to imaging tool 20 can be identified, and also the distances D1, D2 estimated. Accordingly, with this information at hand, operators of the drilling system can take actions to avoid the bed boundary 52. Optionally, the imaging information can be accessed to purposefully intersect the bed boundary 52 with the drilling system 10.

Further illustrated in FIG. 4 is an example of a controller 53 that is in communication with the sensing units of FIGS. 3A through 3E and FIGS. 2C, 2D via communication means 54. As such, the readings obtained by the sensors is processed within a processing unit of controller 53 and the information regarding bed boundary 52 is calculated. Software for performing these functions can be installed on the controller 53 or provided by another source having a readable medium. Examples exist where the controller 53 is also in communication with one or more of the power sources 29, 35 (FIGS. 2A and 2B) so that selective dipole sources can be energized. Controller 53 can optionally be disposed within tool 20. Alternatives exist where data is stored within memory (not shown) disposed in tool 20 and retrieved after tool 20 is removed from wellbore 12.

Figure 5A:
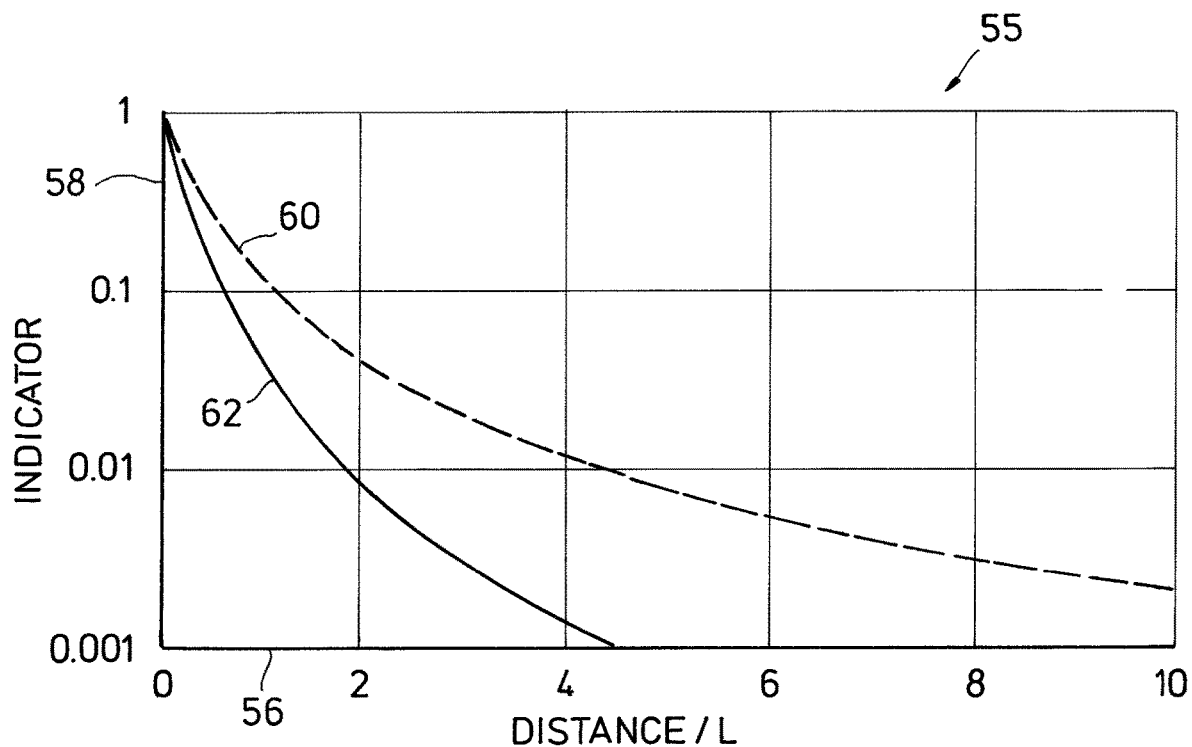
FIGS. 5A-5C are graphs with plots formed with values of signal deviation versus distance of known and presently disclosed transducer configurations.

Referring to FIG. 5A, shown is an example of graph 55 having an abscissa 56 that represents a ratio of distances from the dipole source to a bed boundary 52, and a length between the dipole source and sensor on the imaging tool 20. The ordinate 58 of graph 55 represents detected changes in magnitude of magnetic flux response sensed by the sensors. Graph 55 was generated using the following relationship: $E_i(D)=E_i^0(1+\delta_i(D))$, where $E_i^0$ is the sensed response in the homogeneous formation of conductivity σ and $\delta_i(D)$ is an indicator of an approaching boundary, for i='coaxial' and 'coplanar' measurements. Similarly the transverse magnetic flux is noted as $B_i(D)=B_i^0(1+\delta_{magnetic}(D))$, where $B_i^0$ is the magnetic flux response in the homogenous formation and $\delta_{magnetic}(D)$ is an indicator of an approaching boundary.

Here, line 60 represents prophetic data obtained for an imaging tool having a dipole source that generated an electric dipole transverse to an axis of the tool or borehole, and a magnetic sensor with windings that sensed magnetic fields in a direction orthogonal to the axis of the tool and also to the transverse electric dipole source. Further shown is a line 62 which represents prophetic data $\delta_{coaxial,\ coplanar}(D)$ from a known tool (not shown) having electric dipole sources and electric field sensors. An advantage of the presently disclosed system is evident from the results of FIG. 5A in that the indication of a bed boundary is evident at a one percent difference, and at a distance over that twice that of the known electric dipole source and electric field sensor system of detecting bed boundaries. Further, in the example of FIG. 5A, the distances evaluated are those along the axis of borehole, and what is referred to herein as the looking ahead value.

Figure 5B:
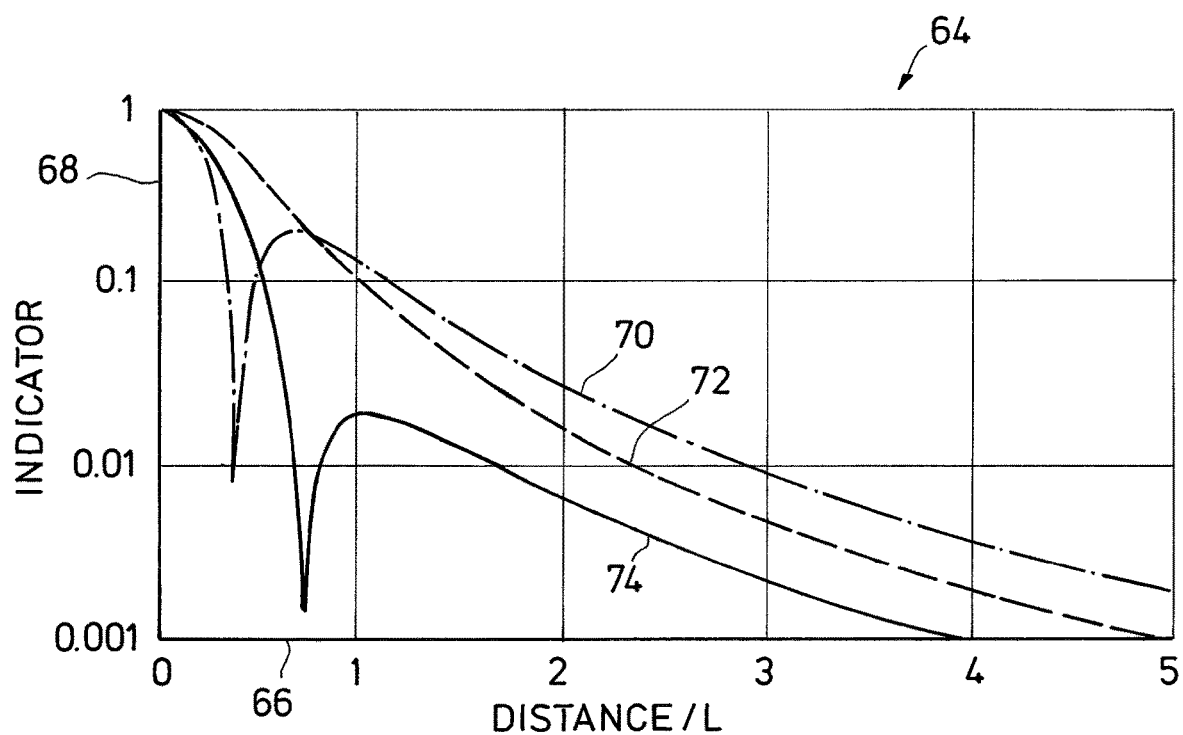

Shown in FIG. 5B is a graph 64 having an abscissa 66 and ordinate 68 with the same representations of that of FIG. 5A. Lines 70, 72, 74 illustrate ratios of variations in magnetic flux measurement and electric field measurement as compared to a ratio between the detected bed boundary distance and signal to source spacing. The example data used to generate FIG. 5B represent an instance where the bed boundary is a distance that is radial to an axis of the tool 20. This directional viewing is referred to herein as a "look around" application. Line 70 represents an example of tool (not shown) where the electric dipole source and electric field sensor form dipoles that are coplanar with one another, which in this example would be that the dipoles are transverse to the tool body, and the dipole directions are pointing toward the distant formation. Line 72 represents an example of a tool (not shown) where the electric dipole source and electric field sensor form dipoles that are coplanar with one another, which in this example would be that the dipoles are transverse to the tool body but the dipole directions are parallel to the distant formation. Line 72 also represents an example of tool 31 of FIG. 3A where the electric dipole source and magnetic flux sensor are transverse to the tool body, and orthogonal to the electric dipole. Line 74 represents prophetic results taken from a tool (not shown) where the electric dipole source and the electric field sensor are coaxial.

Figure 5C:
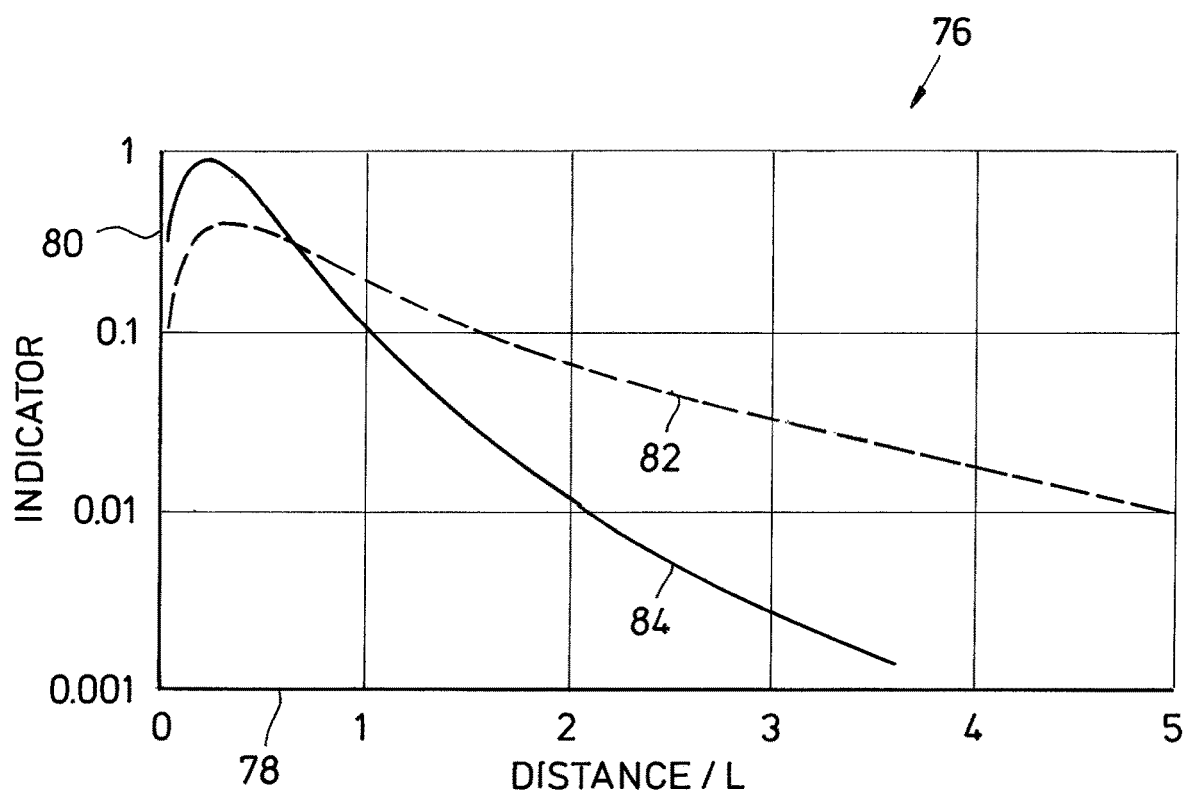

Illustrated in FIG. 5C is an example of a graph 76 whose abscissa 78 and ordinate 80 are the same as graphs 55, 64 from FIGS. 5A and 5B, respectively. Included on graph 76 is a line 82 that represents data obtained from a tool having transverse electric dipole source and axial magnetic flux sensor. Also included with graph 76 is line 84 that represents data obtained from a known tool (not shown), wherein the known tool includes an axial electric dipole source, a transverse electric field sensor, a transverse electric dipole source, and an axial electric field sensor. However, there are other responses that may be useful for look-around detection. The cross component electric field responses, namely, the transverse electric field response from the axial electric dipole source and the axial electric field response from the transverse electric dipole source, are zero in a homogenous formation. However, these signals become detectable once the bad boundary is close to the tool. In one example, an indicator for cross component responses is defined by the following relationship: $E_{cross-component}(D)=E_{coplanar}^0 \delta_{cross-component}(D)$. The transverse magnetic flux response from the axial electric dipole source, and the axial magnetic flux response from the transverse and parallel to the bed boundary electric dipole source are also zero in a homogeneous formation. However, these responses become detectable for a nearby boundary sideway from the tool. In an embodiment, the indicator for this magnetic flux response is defined with respect to the transverse magnetic flux as: $B_{mag-axial}(D)=B_{transverse}{}^0\delta_{mag-axial}(D)$.

As provided in FIG. 5C, the tool with the magnetic sensor detects a 10% change in sensed response at a distance/L ratio of 5, whereas the electric dipole/electric field sensor tool senses 10% change in sensed response at a distance/L ratio of 2. Thus the results of using the tool with the magnetic sensor (line 82) provides sensitivity at greater distances for detecting the bed boundary than the tool with the electric dipole source and electric field sensor (line 84). Further, in FIG. 5C, the distances are in a look around application. It should be noted that the cross-component electrical field measurement of line 84 decays at a rate of $1/D^3$.

Figure 6A:
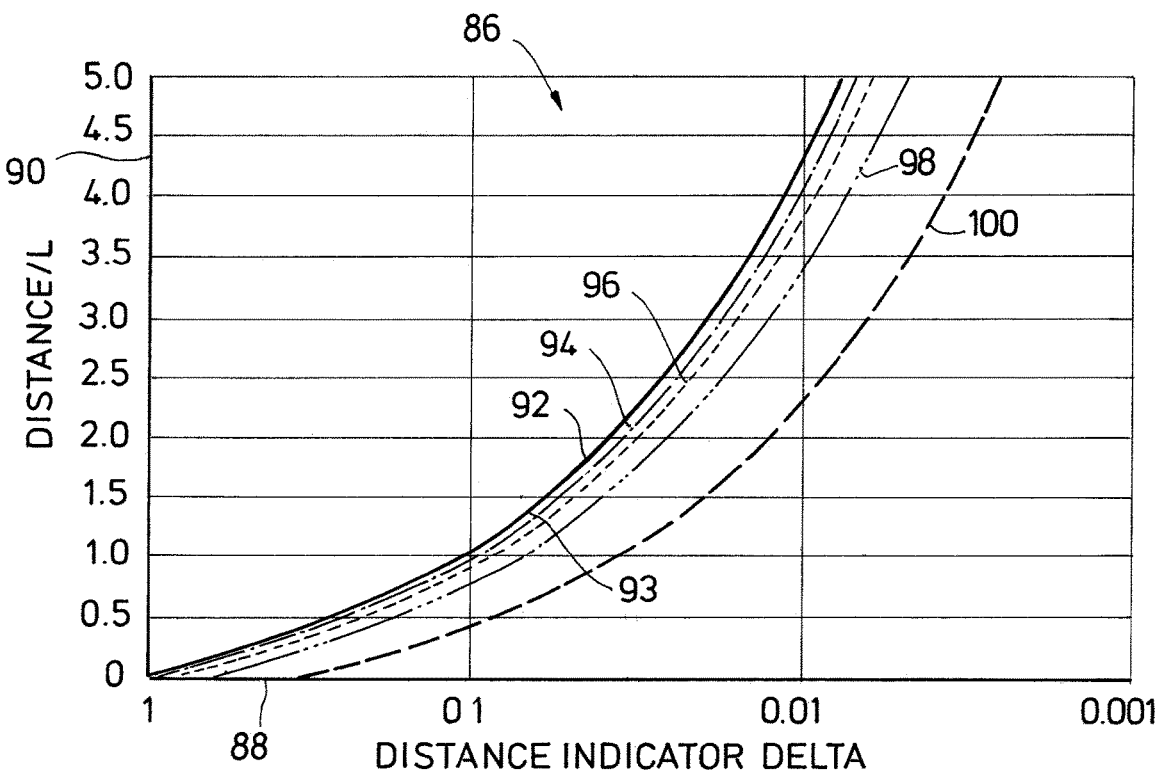
FIGS. 6A and 6B are graphs with plots formed with values of signal deviation versus distance for sensors and transmitters at different spacing.
Figure 6B:
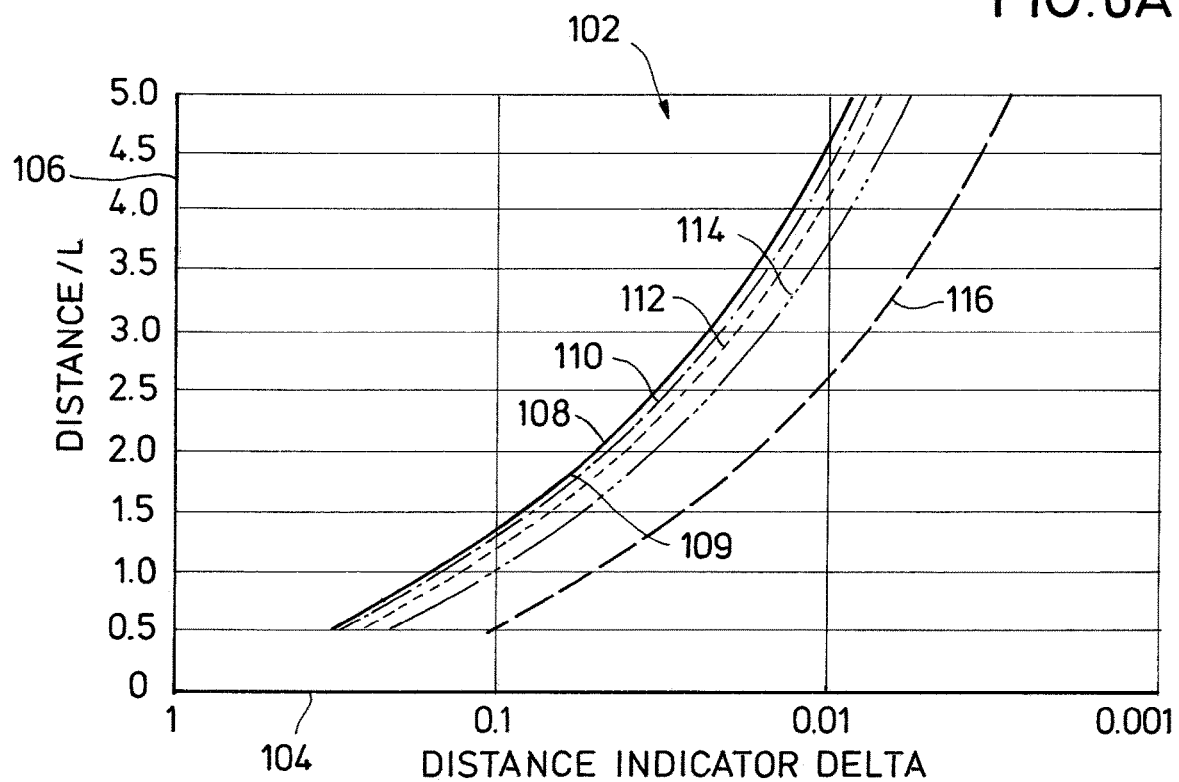

Referring now to FIG. 6A, shown is a graph 86 with an abscissa 88 that represents percent changes in the magnitude of the magnetic field sensed by a sensor in an imaging tool. The ordinate 90 of graph 86 represent the distance to the bed boundary over a length of a spacing between a source and a sensor mounted on the tool. A series of curved lines 92, 94, 96, 98, 100 on graph 86 represent prophetic data taken over different ratios of resistivity between the formation of the target (formation on the side of the bed boundary opposite the imaging tool), over the resistivity of the formation in which the imaging tool is disposed. Line 92 represents values that would occur when the target formation is made up primarily of salt. Line 93 illustrates example data where the ratio of resistivity values is 100, line 94 represents a resistivity ratio of 20, line 96 represents a resistivity ratio of 10, line 98 illustrates a resistivity ratio of 5, and line 100 shows example data for a resistivity ratio of 2. Further, in FIG. 6A the distance is in a looking ahead direction, and the tool 20A is from FIG. 3C. FIG. 6B includes a graph 102 representing data similar to that of FIG. 6A, but in a look around application; and where the tool 20B is from FIG. 3B. Here, the abscissa 104 and ordinate 106 of FIG. 6B are the same as that of FIG. 6A. Line 108 of FIG. 6B represents a target formation made up primarily of salt, line 109 represents a resistivity ratio of 100, line 110 represents a resistivity ratio of 20, line 112 represents a resistivity ratio of 10, line 114 represents a resistivity ratio of 5, and line 116 represents a resistivity ratio of 2.

Figure 7A:
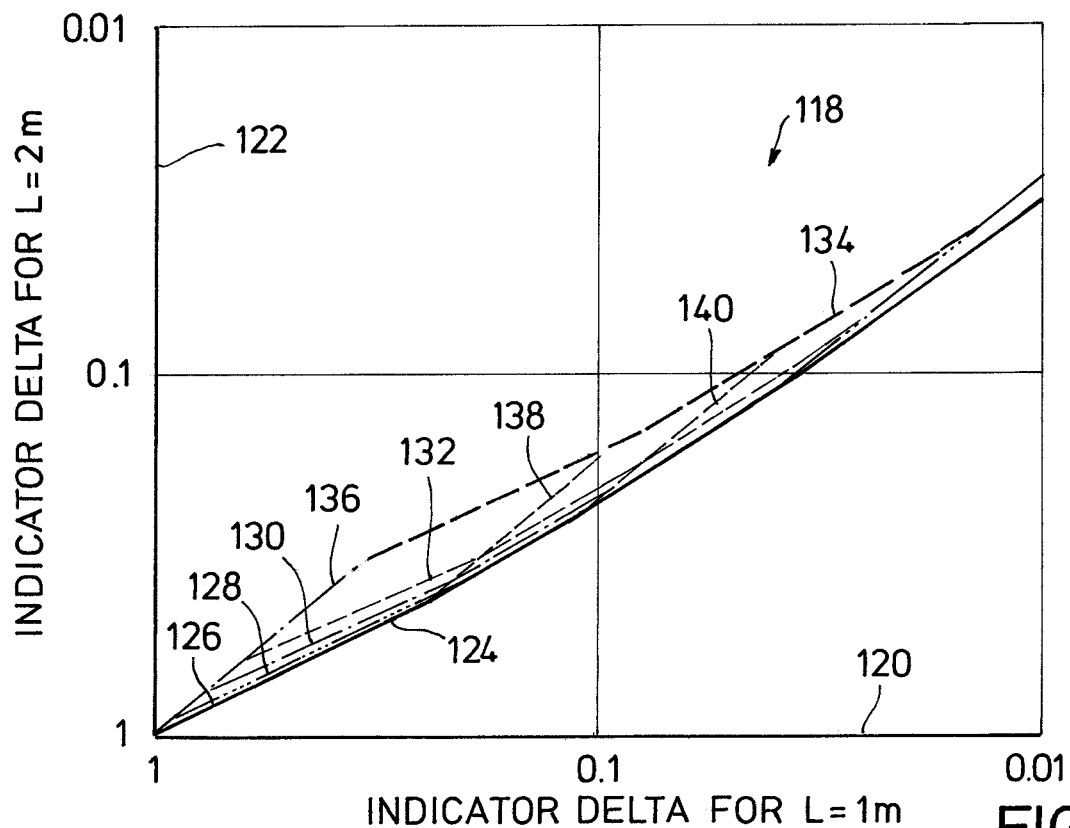
FIGS. 7A and 7B are graphs with plots formed with values of signal deviation versus distance for sensors and transmitters at different spacing.

Referring now to FIG. 7A shown is an example of a graph 118 having an abscissa 120 and ordinate 122, where each of the abscissa 120 and ordinate 122 represent changes in percent magnitudes of magnetic fields sensed by a sensor. However, the values of abscissa 120 are for a spacing between the source and sensor of one meter and where the ordinate 122 represents indicator deltas where the spacing between the source and sensor is 2 meters. The resulting data generates a nomograph that represents look ahead data. Further in this example, line 124 represents data obtained where the target formation includes mainly salt. Line 126 represents data where a resistivity ratio is 100, line 128 illustrates data where a resistivity ratio are 20, line 130 represents data having a resistivity ratio of 10, line 132 represents data where the resistivity ratio is 5, and line 134 represents a resistivity ratio of 2. Additionally, line 36 illustrates a distance $D_1$ from the imaging tool 120 (FIG. 4) and bed boundary 54 of 0 meters, line 138 represents a distance $D_1$ of 0.5 meters, and line 140 represents data obtained where the distance $D_1$ is about 1 meter.

Figure 7B:
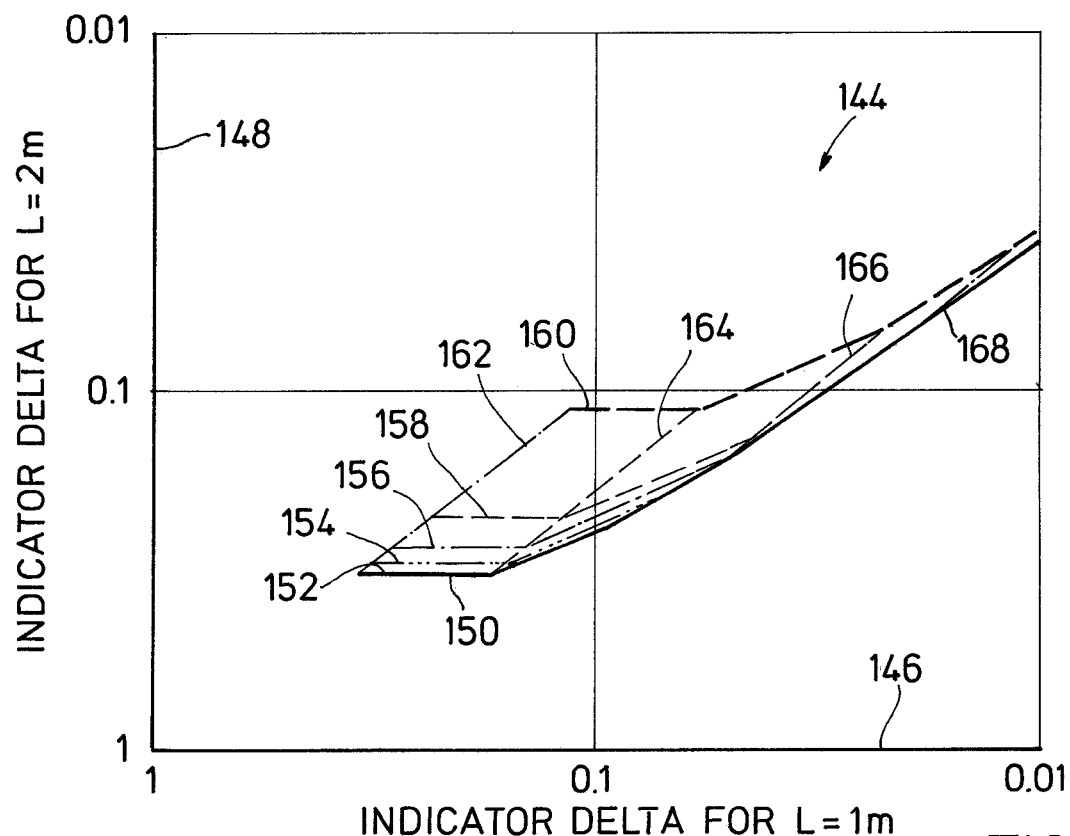

A similar nomograph to that of FIG. 7A is shown in the graph 144 of FIG. 7B where the abscissa 146 and ordinate 148 of graph 144 is the same as that of the ordinate 120 and abscissa 122 of FIG. 7A. In the example of FIG. 7B, the lines represent data obtained in a prophetic example of a look around application. More specifically, line 150 represents data obtained where the target formation is made mainly of salt, line 152 is an example of where a resistivity ratio is 100, line 154 represents a resistivity ratio of 20, line 156 represents a resistivity ratio of 10, line 158 represents a resistivity ratio of 5, and line 160 represents a resistivity ratio of 2. Also, line 162 represents a look around distance $D_2$ from the sensor to the bed boundary 52 of 0.5 meters, line 164 represents data of where the distance $D_2$ is 1 meter, line 166 represents data where the distance $D_2$ is 2 meters, and line 168 represents an offset distance $D_2$ of 3 meters.

Referring now to FIG. 8A, shown in a side partial sectional view is an example of the tool 20A of FIG. 3A imaging a formation 14 that has substantially homogenous properties. Here, dipole $I_X$ is generated by energizing electrodes in electrical transducer 28A. Magnetic field lines 170, formed as a result of dipole $I_X$, define magnetic flux 172. In this example, the lines of flux 170 define a magnetic field 172 that is in a plane substantially transverse to the direction of dipole $I_X$. As shown, magnetic field 172 is generally centric about dipole $I_X$. The presence of the magnitude field 172 sensed by sensor 40A is represented by $B_Y$. As illustrated by the Cartesian coordinate provided in FIG. 8A, the direction of the sensed magnetic field $B_Y$ is along the Y axis, and transverse to both the Z and X axes.

Illustrated in FIG. 8B is that the tool 20A has moved within wellbore 12 from its positon of FIG. 8A to a location such that the magnetic field 172 interacts with the target formation 50 on the opposite side of bed boundary 52. The position of target formation 50 with respect to tool 20A results in a look ahead example of imaging. The interaction generates induced magnetic field lines 174, that in turn define an induced magnetic flux 176. $B_{Yi}$ represents induced magnetic flux 176, and as shown is generally parallel with the actual magnetic field $B_Y$ sensed by sensor 40A at the magnetic sensor on the tool axis. The induced magnetic flux lines 174 are generally circular and have a center that is spaced axially away from transducer 28A along the Z axis of the wellbore 12 and on a side of transducer 28A that is distal from sensor 40A. The sensor 40A senses both magnetic fields 172, 176, and where a delta (indicator) value is obtained that is the difference of magnetic field 172 sensed by sensor 40A, and magnetic field 176 sensed by sensor 40A. In one example, the delta (indicator) value represents the ordinate values in FIGS. 5A-5C.

Figure 9B:
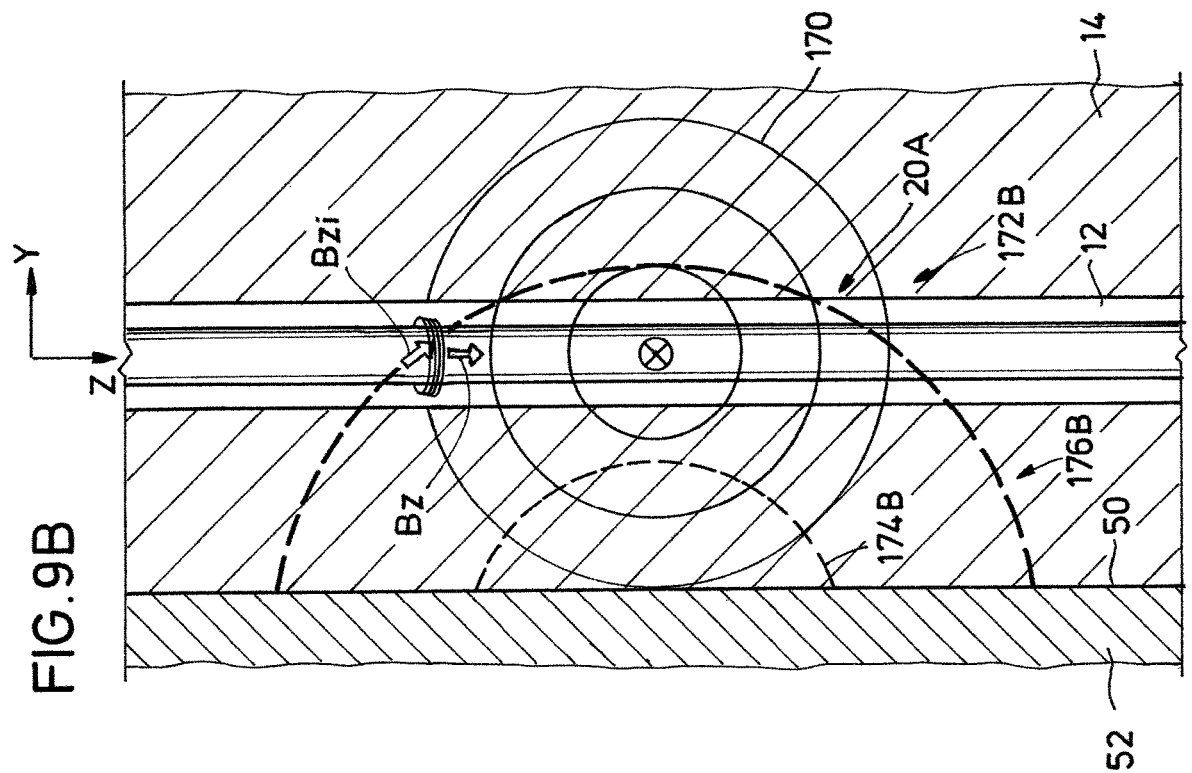
Figure 9A:
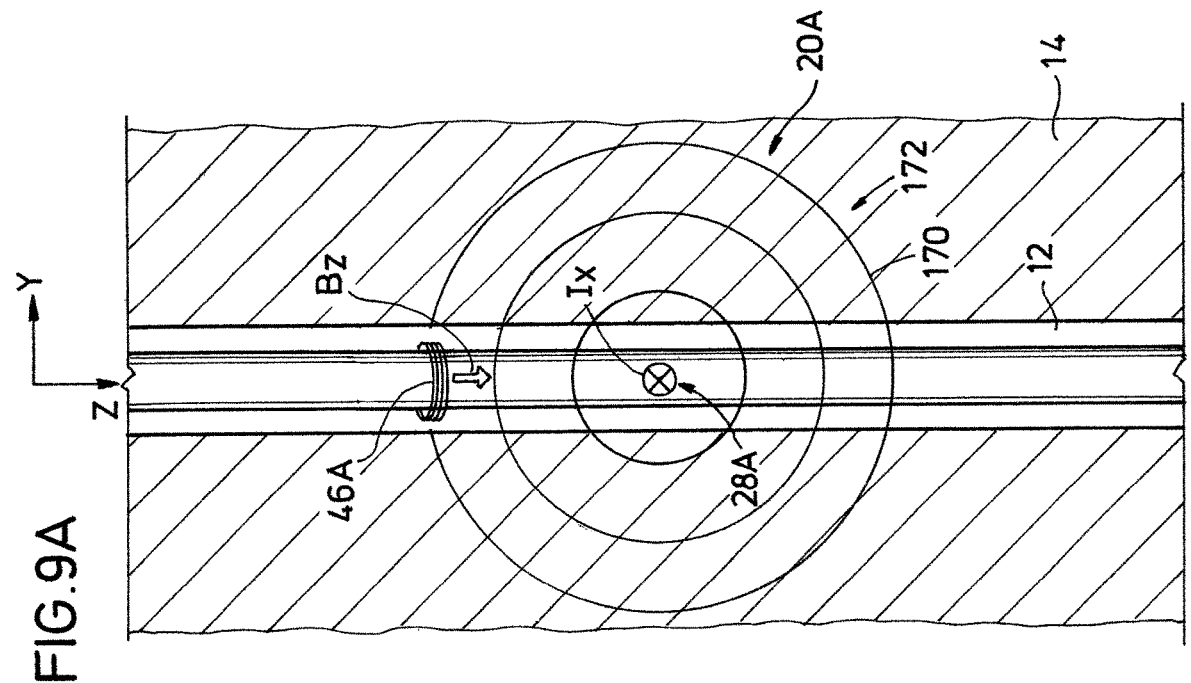

Depicted in FIG. 9A is a plan partial sectional view of an example of the tool 20A of FIG. 3A imaging a portion of formation 14 having substantially homogenous properties. As such, lines of flux 170 define magnetic field 172 in formation 14, and $B_Z$ represents what is sensed by sensor 46A in response to magnetic field 172. In the example of FIG. 9A, the magnitude of $B_Z$ will be zero. Referring now to FIG. 9B, the target formation 52 is radially offset from the Z axis of the wellbore 12, which results in an induced magnetic field 176B whose lines of flux 174B have an origin that is spaced radially away from the Z axis of the wellbore 12. The induced magnetic field at the sensor location has non-zero Z axis component $B_{Zi}$ that is measured by the sensor. Like in the example of FIG. 8B, the sensed magnitudes of $B_{Zi}$ provide information about the presence of and distance from a bed boundary 50.

Referring now to FIG. 10A, shown in a side partial sectional view is an example of imaging tool 20C disposed in wellbore 12 and imaging formation 14. Transducer 34C when energized generates an electric dipole $I_Z$ that is oriented along the Z axis of tool 20C. Here lines of flux 178 generated by transducer 34C are shown being sensed by magnetic sensor 40C. The lines of flux 178 circumscribe dipole $I_Z$ and define a magnetic field 180, and where magnetic field is in a plane transverse to the Z axis of the Cartesian coordinate provided with FIG. 10A. In the illustrated example, $B_Y$ represents what is sensed by sensor 40C in response to magnetic field 180. In the example of FIG. 10A, the magnitude of $B_Y$ is zero.

As shown in FIG. 10B, tool 20C has encountered target formation 50 and where the lines of flux 178 interact with target formation 50 to produce induced lines of flux 182. The induced lines of flux 182 are circular and circumscribe an axis (not shown) disposed in target formation 50 and spaced radially away from the Z axis of FIG. 10B. The induced magnetic field at the sensor location has non-zero y-axis component $B_{\tilde{n}}$ that is measured by the sensor.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of operations in a borehole comprising:
    generating a first electric dipole in the borehole that is parallel with an axis of the borehole, and generating a second electric dipole in the borehole that is transverse to the axis of the borehole, the electric dipoles forming an electromagnetic field in a formation that surrounds the borehole;
    using a coil in the borehole at a location spaced axially away from the electric dipoles to sense magnetic flux that is generated by the electromagnetic field; and
    based on the step of sensing magnetic flux, identifying a distance and a direction from the first electric dipole and the second electric dipole to a bed boundary that is in the formation.

2. The method of claim 1, wherein the bed boundary is spaced away from the electric dipoles in an axial direction of the borehole.

3. The method of claim 1, wherein the bed boundary is spaced away from the electric dipoles in a radial direction of the borehole.

4. The method of claim 1, wherein the measured magnetic flux is oriented substantially parallel to the axis of the borehole.

5. The method of claim 1, wherein the measured magnetic flux is oriented substantially orthogonal to the axis of the borehole.

6. The method of claim 1, wherein the coil is oriented transverse to the axis of the borehole.

7. The method of claim 4, further comprising measuring magnetic flux in a direction that extends along a path that is oriented substantially orthogonal to the axis of the borehole.

8. The method of claim 4, wherein the measured magnetic flux provides an indication of the bed boundary that is spaced away from the electric dipole along a path that is substantially parallel with the axis of the borehole.

9. The method of claim 5, wherein the measured magnetic flux provides an indication of the bed boundary that is spaced away from the electric dipole along a path that is substantially transverse to the axis of the borehole.

10. The method of claim 6, wherein the measured magnetic flux provides an indication of the bed boundary that is spaced away from the electric dipole along a path that is substantially transverse to the axis of the borehole.

11. A method of operations in a borehole comprising:
    generating a magnetic field in a formation that surrounds the borehole by generating electric dipoles in the borehole that are respectively oriented axially and transverse to an axis of the borehole;
    measuring magnetic flux in the borehole at a location that is spaced axially away from the electric dipoles; and
    identifying a bed boundary in the formation based on the step of measuring magnetic flux.

12. The method of claim 11, wherein lines of magnetic flux generated by the electric dipole transverse to the axis of the borehole that are being measured extend along a path that is selected from the group consisting of generally parallel with an axis of the borehole and generally orthogonal to the axis of the borehole.

13. The method of claim 11, wherein lines of magnetic flux generated by the electric dipole axially oriented to the axis of the borehole that are being measured extend along a path that is orthogonal with the axis of the borehole, and wherein the axially oriented electric dipole is formed within a drill string having a drill bit, the method further comprising steering the drill bit away from the bed boundary.

14. A tool for use in a borehole comprising:
    a means for forming electric dipoles that generate magnetic fields in a formation surrounding the borehole, the means being coupled to a housing of the tool, and the magnetic fields being oriented transverse to one another;
    a means for sensing magnetic flux generated by the electric dipoles;
    a housing disposable in the borehole that is coupled to the means for forming electric dipoles and coupled to the means for sensing magnetic flux; and
    a means for identifying the presence of a bed boundary in the formation in a direction spaced axially and radially from the housing.

15. The tool of claim 14, wherein the means for forming electric dipoles comprises transversely disposed electrodes that generate a dipole that projects transverse to an axis of the housing, and comprise coaxially aligned ring electrodes, and wherein the transversely disposed electrodes and ring electrodes are coaxially disposed.

16. The tool of claim 14, wherein the means for sensing magnetic flux generated by the electric dipoles comprises a winding that is generally coaxial with an axis of the housing.

17. The tool of claim 14, wherein the means for forming electric dipoles comprises axially spaced apart ring electrodes that are disposed at a distance of from one foot to around two feet from the means for sensing magnetic flux.

18. The tool of claim 14, wherein the means for sensing magnetic flux generated by the electric dipole comprises windings that are generally coaxial with a path that extends orthogonal with an axis of the housing and a winding that is generally coaxial with the axis of the housing.

19. The tool of claim 14, wherein the means for forming electric dipoles comprises transversely disposed electrodes that generate a first electric dipole that projects transverse to an axis of the housing and axially spaced apart ring electrodes that generate a second electric dipole that projects generally parallel with the axis of the housing, and wherein the means for sensing magnetic flux generated by the electric dipoles comprises windings that are generally coaxial with a path that extends orthogonal with the axis of the housing.

\* \* \* \* \*